Figure 2:
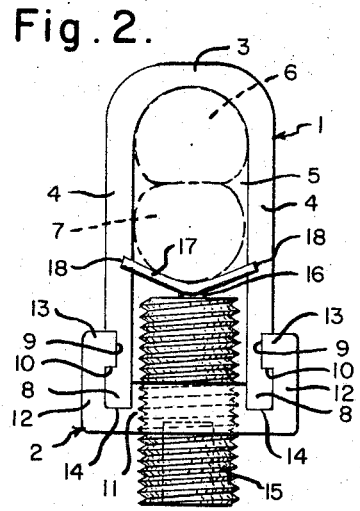

Aug. 29, 1967   G. S. WALTER ET AL   3,339,174
APPARATUS FOR JOINING ELECTRICAL CABLES
Filed Jan. 11, 1966   2 Sheets-Sheet 1

INVENTORS
Gerard S. Walter &
John Hagan

Their Attorneys

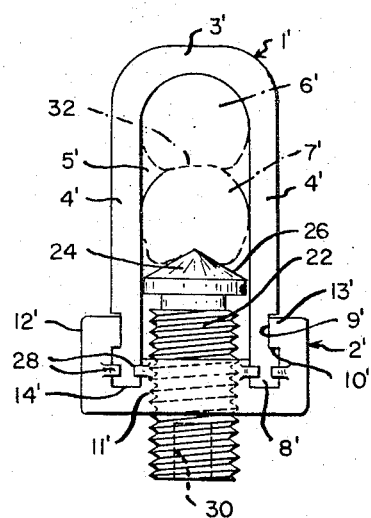

United States Patent Office 3,339,174
Patented Aug. 29, 1967

3,339,174
APPARATUS FOR JOINING ELECTRICAL CABLES
Gerard S. Walter and John Hagan, both of Hampton Township, Allegheny County, Pa. (% Gerald E. Walter, 2629 Middle Road, Glenshaw, Pa. 15116)
Filed Jan. 11, 1966, Ser. No. 532,023
5 Claims. (Cl. 339—244)

This application is a continuation-in-part of our copending application of the same title, filed Feb. 19, 1965, Ser. No. 433,985, now abandoned.

The present invention relates to apparatus for electrically connecting the ends of electrical cables. It is particularly adapted for use in joining electrical cables of the sizes used in commercial and industrial applications.

It is common practice to bring electrical cables which are to be joined into a junction box, to strip insulation from the ends of the cables, and then to clamp the bared ends of two or more cables together for the purpose of connecting them electrically. A commonly used form of clamp comprises a cast saddle having two extending arms which are threaded to receive a nut. A pressure member is also provided which fits into the central portion of the saddle between the two arms and provides a bearing surface between the nut and the cable ends. By turning down the nut upon the threaded projections of the saddle, the pressure member is advanced into the slot in the saddle, bringing the bared cable ends tightly together in electrical contact compressed between the closed end of the saddle and the pressure member. Such devices are expensive to make in that they contain three separate castings, two of which must also be machined and threaded to ensure proper assembly and fit between them. In tightening such clamps, it is necessary to place one wrench upon the nut and to hold the saddle with another wrench to prevent the cables from being twisted. To enable a wrench to be placed onto the saddle, it is the necessary practice to allow extra cable so that the ends may be clamped together out of the junction box. Thus the ends of cable in the box are cut to such a length that the cable ends are brought out of the box and the ends are overlapped in position to be joined while several inches in front of the box. In this manner, a wrench can be applied to the saddle from behind the cables, but in front of the box and the clamp drawn up tightly without damage to the cables. As a result, however, there is excess cable which must be bent and stuffed into the junction box after the connection has been made. When dealing with heavy cables, a substantial problem is presented to the electrician in stuffing the junction box and then closing the cover. In many cases, it is impossible to close the junction box cover without at least springing it out of shape. Moreover, the job of fitting the excess cable within the junction box is a time-consuming operation which substantially adds to the cost of making the connection.

We have invented new and useful apparatus which avoid the shortcomings of prior clamps known to us. We provide a body member having a recess formed therein, a closure member spanning across the recess and interlocking with the body member to form a rigid and substantially unitary structure. We further provide screw means threadably engaging said unitary structure and projecting into the recess, and clamping or pressure means intermediate the screw means and the portion of the recess remote from the screw means. We preferably provide a channel shaped member, closure means bridging across the opening in the channel member and interlocking with said channel member, screw means threadably engaging the closure means and extending into the slot formed by the channel member, and clamping means positioned within the slot adjacent the end of the screw. We further prefer to provide flange means formed in the channel member adjacent the edges of the channel member and flange means formed to the closure means and arranged to fit in cooperating relationship with the flanged means upon the channel member. We prefer to provide interlocking flanges upon the body member and the closure member so that when the respective flanges are engaged, a solid and unitary structure is formed having rigidity against the clamping forces. We further prefer to provide lug means formed in the clamping member to engage the edges of the slot whereby axial movement of the clamping means through the slot is limited.

These and other objects, features and advantages of the invention, together with structural details thereof, will be elaborated upon during the forthcoming description of certain presently preferred embodiments of the invention, together with presently preferred methods of practicing the same.

Figure 3:
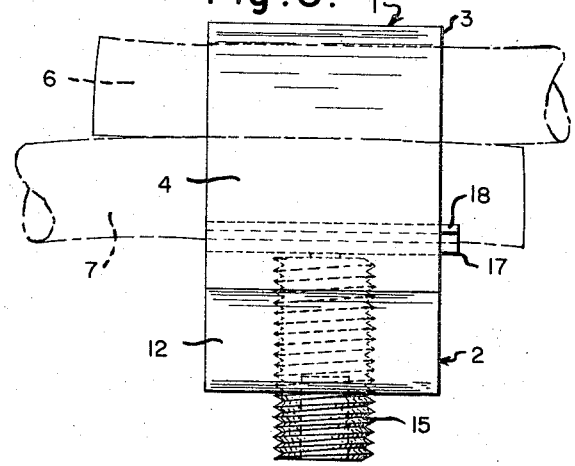
Figure 1:
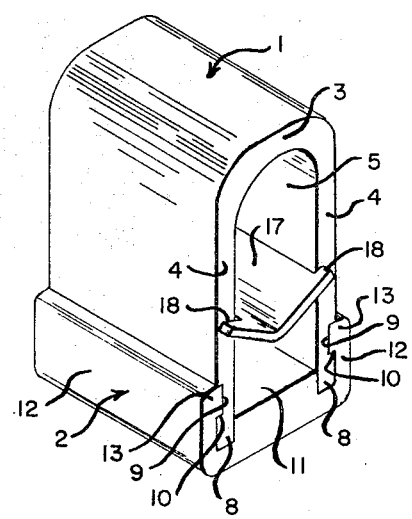
Figure 4:
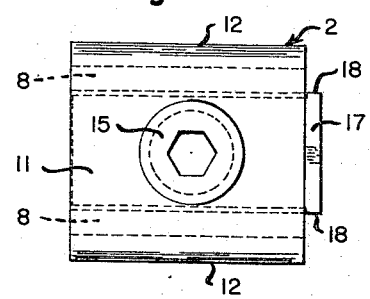
Figure 5:
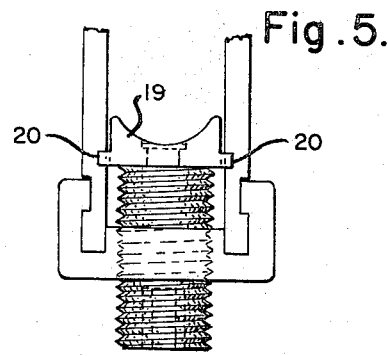

In the accompanying drawings, we have illustrated a present preferred embodiment of our invention in which
FIGURE 1 is an isometric view of a cable clamp embodying our invention;
FIGURE 2 is an end elevation of the clamp shown in FIGURE 1;
FIGURE 3 is a side elevation of the clamp shown in FIGURE 1;
FIGURE 4 is a bottom plan view of the clamp shown in FIGURE 1;
FIGURE 5 is a view of a portion of the clamp shown in FIGURE 1 having a modified form of clamping or pressure member;
FIGURE 6 is an end elevational view of another form of clamp embodying our invention;
FIGURE 7 is a top plan view of the cover member and fastening means shown in FIGURE 6 with a portion of the cover broken away;
FIGURE 8 is a top and left side isometric view of still another form of cable clamp embodying our invention;
FIGURE 9 is an end elevational view of the clamp shown in FIGURE 8; and
FIGURE 10 is a bottom plan view of the clamp shown in FIGURE 8, with the cover thereof removed and taken on the line X—X of FIGURE 9.

The clamp shown in FIGURE 1 includes a body member 1 and a cap member 2. When properly fitted together, they form a single unitary structure which rigidly resists loads developed by clamping action. Body member 1 is preferably an extruded U-shaped channel cut to proper length from the extrusion. Body member 1 comprises a closed end 3 and planar parallel side sections 4. A slot 5 is formed in the channel of size to receive cables to be clamped without leaving excess space. In other words, the width of slot 5 between the inner walls of side sections 4 is the same as the diameter of the cables plus a small amount of clearance to enable the cables to be fitted readily into slot 5. It will be seen that the ends of cables 6 and 7 which are to be joined fit into slot 5 without excess free space. Side portions 4 of body member 1 terminate in edges 8 which are remote from closed end 3 of body member 1. An axially extending recess 9 is formed in the outer wall of each side portion 4 forming flanges or bearing surfaces 10 adjacent the edges 8 of body member 1.

Cap member 2 includes a central body portion 11 which bridges across between the edges 8 of the two side sections 4. Lugs 12 extend away from central portion 11 and wrap around the edges of side sections 4. Each lug 12 terminates in a flange 13 which is fitted into a recess 9 in an axially sliding fit. Axially extending recesses 14 are formed in cap 2 between body portion 11 and lugs 12. The recesses 14 receive edges 8 of the body member and both the inner and outer surfaces of side portions 4 are engaged by the edges of recesses 14 in an axially sliding fit.

A set screw 15 is threaded through the central portion of body portion 11 of cap member 2. The set screw is preferably of the type having a recessed hexagonal socket in the middle for the reception of a wrench. The inner end of screw 15 projects into the slot in body member 1. Set screw 15 preferably ends in a small stud 16.

A clamp or pressure member 17 is provided to fit upon stud 16. A centraly located hole is preferably drilled in clamp 17 and stud 16 is then inserted into the hole and the end of the stud flattened and enlarged. In this manner, stud 16 and clamp 17 are free to rotate relative to each other, but the flanged end of stud 16 prevents clamp 17 from being separated from set screw 15. Clamp 17 is slightly smaller than the width of slot 5 and so can readily be moved in the slot. Lugs 18 are provided at one end of clamping member 17. Lugs 18 extend beyond the width of slot 5 so that clamp 17 can be moved axially into slot 5 in only one direction. When clamp 17 is so moved until it is in the full distance, lugs 18 engage the edges of slot 5 and prevent further axial movement.

Clamp 17 is pressed out of flat stock, the shape being formed in a stamping operation. An alternate form of clamp 19 is shown in FIGURE 5. Clamp 19 is equipped with lugs 20 which limit axial movement of the clamp. The face of clamp 19 away from the set screw has a concave cylindrical surface adapted to fit against a bared cable end. Clamp 19 is formed of extruded material which is cut to length and has lugs 20 formed thereon.

In the use of the clamp, the cables are brought into the junction box end. The ends 6 and 7 are cut to length and then stripped of insulation. The cable ends are overlapped as shown in FIGURE 3. The overlapping is done in the junction box, however, without providing any excess cable so that the cables go directly from their point of entry into the junction box to the point of connection. When the bared cable ends are overlapped as shown in FIGURE 3, body member 1 is fitted onto the cables from the rear with side sections 4 projecting toward the open side of the junction box. Set screw 15 is then turned to bring clamp 17 against cap member 2. Cap member 2 is then slid axially into place with the small end of clamp 17 fitting into slot 5 until lugs 18 come into contact with side sections 4. At that point body member 1 and cap member 2 form a single structure which will remain unitary and will resist clamping forces which are generated. Lugs 18 permit the entire assembly to be conveniently held in assembled position with one hand while set screw 15 is turned down with the other hand until a moderate clamping pressure is developed. At that point a wrench is applied from outside the junction box with its jaws upon lugs 12 of the cap member. A wrench is then fitted into the socket in set screw 15 and the set screw is tightened. Tightening of the set screw forces clamp 17 toward the closed end of slot 5 compressing the cable ends between end 3 of body member 1 and the concave surface of clamp 17. Since the diameter of the metal of cables 6 and 7 is substantially the width of slot 5, there is relatively little deformation of the cables or breakage of individual strands as would occur if the cables were equalized between flat jaws without lateral restraint. Since the cables are held in substantial alignment and have little deformation, such deformation as does occur is largely the intermeshing of strands. That action enlarges the amount of surface contact and is conducive to obtaining the best possible contact and low resistance. It will be appreciated that if the ends of the strands were splayed out, the several strands would tend to cross each other with point contact instead of lying parallel with extended line or planar contact.

After the clamp has been tightened, it becomes effectively a rigid and unitary structure. The clamping force tends to separate body member 1 and cap member 2. Since the edges of the two sections are interlocked, the only force applied is in shear. The side portions 4 of the body member form a slot 5 of uniform width and are maintained in that position by the edges fitted into recesses 14. Thus a hard clamping force cannot bring about a bending of either body member 1 or cap member 2 causing them to spring apart under load. The clamping force likewise locks the body member and cap member against each other with sufficient force that relative axial movement between them is virtually impossible.

It will be apparent that clamping member 19 is effective in the same manner as clamp 17. It is likewise clear that the use of a soft readily extrudable conductive material is most satisfactory. That enables stock for the body member and the cap member to be extruded and cut to length. The clamping member may be stamped or extruded as desired. Set screw 15 is readily obtained in the market.

Referring now to FIGURES 6 and 7 of the drawings another form of our cable clamp is illustrated therein. In the latter arrangement of the invention similar reference characters with primed accents denote similar components of FIGURES 1 to 4 of the drawings. This form of the invention therefore includes a body or saddle member 1' and a cap member 2'. A unitary screw and clamp member 22, however, threadedly engages a suitable, tapped aperture therefor in the body of bridging portion 11' of the cap member 2'. The clamping portion 24 of the clamping screw 22, as better shown in FIGURE 7, desirably is formed symmetrically about the axis of rotation of the clamping screw 22 and extends laterally substantially across the width of opening 5' in the saddle member 1', save for relatively small clearances between the clamp member 24 and the side walls 4'.

In this example, the surface of the clamping member 24 which is juxtaposed to the cable end 7' is provided with a conical configuration 26 with the apex thereof desirably lying on the aforementioned rotational axis of the clamp screw 22. It is also preferred that the conical surfaces 26 be suitably polished in order to minimize or to eliminate altogether any grinding action upon the adjacent bared conductor end 7' as the clamp screw 22 is rotated with its conical surfaces 26 in engagement therewith.

In this arrangement of the invention it will be seen that our cable clamp is still further simplified through the elimination of a separate clamp such as the clamp 17 or 19.

In the operation of this form of the invention the bared cable ends 6', 7' are loosely fitted into the opening 5' of the saddle member 1', and the clamping screw 22 is threaded downwardly, as viewed in FIGURE 6, until the overlying outer periphery of the clamp portion 24 thereof engages the upper surface of the cover 2' to prevent further withdrawal of the clamp screw 22. The opening 5' is sized such that the side walls 4' of the saddle member are closely spaced from the bared cable ends 6', 7', and are of sufficiently heighth to permit the cover 2' and the withdrawn clamping screw 22 to be slid axially into place with the clamp portion 24 fitting into slot 5', until lugs 28, desirably formed integrally upon the front end of cover 2' at the adjacent ends of recesses 14' therein limit further movement of the cover 2'.

Clamping force is then applied to the bared conductor ends 6', 7' by turning the clamping screw with a suitable wrench cooperating with the hexagonal recess or other suitably shaped wrench socket 30. As the clamping portion 24 is formed toward the closed end of the saddle member 1' the conical configuration tends to separate the strands of the adjacent cable end 7' so that the latter assumes the cross sectional configuration shown in FIGURE 6. Since the cable ends 6', 7' are laterally confined by the saddle side walls 4' additional deformation thereof occurs in the area of their engagement as denoted by reference character 32, which has the effect of increasing the area of electrical contact therebetween and attendant reduction of electrical resistance.

It is contemplated, of course, that other symmetrical surfaces can be employed in place of the conical surface 26 of the clamp member 24. For example, a convex spherical surface can be employed depending upon the application of the invention. However, in many applications a conical surface is preferable owing to its action in initially separating the strands of the adjacent cable end 7′ in order to increase the area of clamping engagement between the cable end 7′ and the clamping member 24 to prevent latter loosening of the clamp where the latter might be subjected to vibrational forces and the like.

Referring now to FIGURES 8, 9 and 10 of the drawings, still another form of our cable clamp is illustrated therein. In FIGURES 8 and 9 similar reference characters with primed accents also denote similar components of FIGURES 1 to 4 or of FIGURES 6 and 7, as the case may be. In the cable clamp as arranged in accordance with FIGURES 8 and 9 the saddle member 1′ is provided with an integrally formed mounting bracket 34 having aperture means 36 through which a suitable fastener can be passed. It is to be understood, of course, that the saddle or body member of any of the previously described forms of the invention can be similarly provided with the mounting bracket 34, if desired.

In the latter arrangement of the invention the saddle member 1′ is further provided with a slidably mounted contact member 38, which is loosely mounted in the opening 5′ of the saddle member 1′. The contact member 38 is shaped as to length and width to bridge substantially the length and width of the opening 5′, save for small lateral clearances between the contact member 38 and the side walls 4′ of the saddle member. The contact member 38, however, desirably protrudes beyond each end of the opening 5′ as better shown in FIGURE 9 of the drawings, and one or more retaining tabs 40 are formed on each protruding end of the contact member 38, which loosely engages the adjacent associated ends of the side walls 4′ as the contact member 38 is slidably moved within the opening 5′. The outwardly extending tabs 40 therefore retain the contact member 38 within the opening 5′, against axial movement relative thereto, once the contact member 38 is inserted through the open bottom end of the saddle member 1′. Contact members 38 can be formed by severing an extruded material, such as aluminum, into suitable lengths after which the tabs 40 can be formed integrally at the ends of such severed portion, as by swaging or the like.

In the operation of this form of our cable clamp, the bared end 6′ is first inserted into the opening 5′, the contact member 38 is then inserted followed by the other bared end 7′. The contact member provides a large surface engagement with each of the bared ends 6′, 7′ and, in furtherance of this purpose, is provided with opposed concave cylindrical surfaces 42 which are shaped to closely engage the conductor ends 6′ and 7′ respectively. With the contact member 38 being fabricated from a material of high electrical conductivity, the contact member 38 effectively increases the amount of surface contact between the conductor ends 6′ and 7′ when clamping force is applied thereto by turning the clamping screw 22′.

It is to be understood, however, that the contact member 38 can be similarly employed with any of the saddle members 1 or 1′ illustrated in the preceding figures of the drawings.

From the foregoing it will be readily apparent that novel and efficient forms of a cable clamp have been disclosed herein. It will be seen moreover, that the various modifications of our clamp are readily and cheaply fabricated, and that it can be used more quickly with less labor than can be conventional clamps and that it permits a better and neater job to be done than was heretofore possible.

While we have illustrated and described present preferred embodiments of our invention, it is to be understood that we do not limit ourselves thereto, and that our invention may otherwise variously be practiced within the scope of the following claims.

We claim:

1. A clamp for joining electrical cables comprising a channel member having substantially parallel walls and flange means formed therein adjacent the two edges of the channel member, a closure member having flange means formed therein adapted to engage the channel member flange means in interlocking relationship against transverse movement between the channel member and the closure member whereby the closure member bridges across the gap between the edges of the channel member, screw means threadably engaging the closure member and extending into the slot formed by the channel member, clamping means positioned in the slot adjacent the projecting end of the screw means whereby rotation of the screw means urges the clamping means against cable ends fitted into the slot pressing them tightly together in good electrical contact, said clamping means being formed integrally with said screw means for rotation therewith and being shaped symmetrically about the axis of rotation of said screw means to minimize wear of the adjacent one of said cable ends when engaged by said clamping means upon rotating said screw means, and the peripheral edges of said clamping means overlying the threaded engagement of said screw means with said closure member, said peripheral edges thereby forming an outwardly extending flange on said clamping means to prevent withdrawal of said screw means from said closure member when said channel member and said closure member are engaged in said interlocking relationship.

2. The combination according to claim 1 wherein the surface of said clamping means adjacent said cable ends is a conical configuration with the apex thereof projecting toward said cable ends and lying upon the rotational axis of said screw means.

3. The combination according to claim 1 wherein said clamping means substantially bridges the width of said slot and has a peak lying on said axis and extending toward said cable ends when inserted into said slot so that turning down said screw means tends to separate the strands of the adjacent one of said inserted cables ends to facilitate penetration of said screw means into said adjacent cable and retention of said cable end in said slot.

4. A clamp for joining electrical cables, said clamp comprising a body member having a pair of spaced generally parallel side walls extending therefrom and defining an axially extending slot therebetween, a cap member having a pair of spaced generally parallel grooves disposed to slidably receive the ends of said side walls respectively, said grooves defining a bridging member forming part of said cap member and extending between said side walls, said cap member having a pair of spaced generally parallel lugs extending therefrom and disposed to overlay the outer surfaces of the adjacent end portions of said body side walls respectively each of said lugs having an inwardly extending flange slidably engageable in a recess therefor formed in the adjacent one of said outer surfaces whereby the cap member can be slid axially to close said slot with said flange means preventing relative transverse movement between said body member and said cap member and said cap member grooves, said bridging member preventing relative movement between the free ends of said side walls, screw means threadedly engaging the cap member and extending therethrough, cable engaging means positioned on said screw means for engaging a cable end when inserted into said cable clamp so that turning down said screw means urges said cable engaging means toward the closed end of said body member and presses cable ends inserted into said slot tightly together in good electrical contact, said cable engaging means being formed integrally with said screw means for rotation therewith and being shaped symmetrically about the axis of rotation of said screw means to minimize wear of the adjacent one of said cable ends when engaged by said cable engaging means upon rotating said screw means and the peripheral edges of said cable engaging means overlying the threaded engagement of said screw means with said cap member, said peripheral edges thereby forming an outwardly extending flange to prevent withdrawal of said screw means from said cap on said cable engaging means when said channel member and said cap member are engaged in said interlocking relationship.

5. The combination according to claim 4 wherein the surface of said cable engaging means adjacent said cable ends is a conical configuration with the apex thereof projecting toward said cable ends and lying upon the rotational axis of said screw means.

References Cited

UNITED STATES PATENTS

| 1,968,060 | 7/1934 | Utiger | 339—272 X |
| 2,196,383 | 4/1940 | Buchanan | 339—272 |
| 2,205,322 | 6/1940 | Thomas et al. | 339—272 |
| 2,285,928 | 6/1942 | Jensen | 339—272 |
| 2,287,762 | 6/1942 | Rogoff | 339—272 |

FOREIGN PATENTS

| 1,012,800 | 4/1952 | France. |
| 1,098,753 | 3/1955 | France. |
| 473,771 | 8/1952 | Italy. |

MARVIN A. CHAMPION, *Primary Examiner.*

P. TEITELBAUM, *Assistant Examiner.*